Aug. 29, 1944.   M. C. TATE   2,357,272
MULTIPLE LOAD RANGE WEIGHING SYSTEM
Filed Nov. 10, 1943
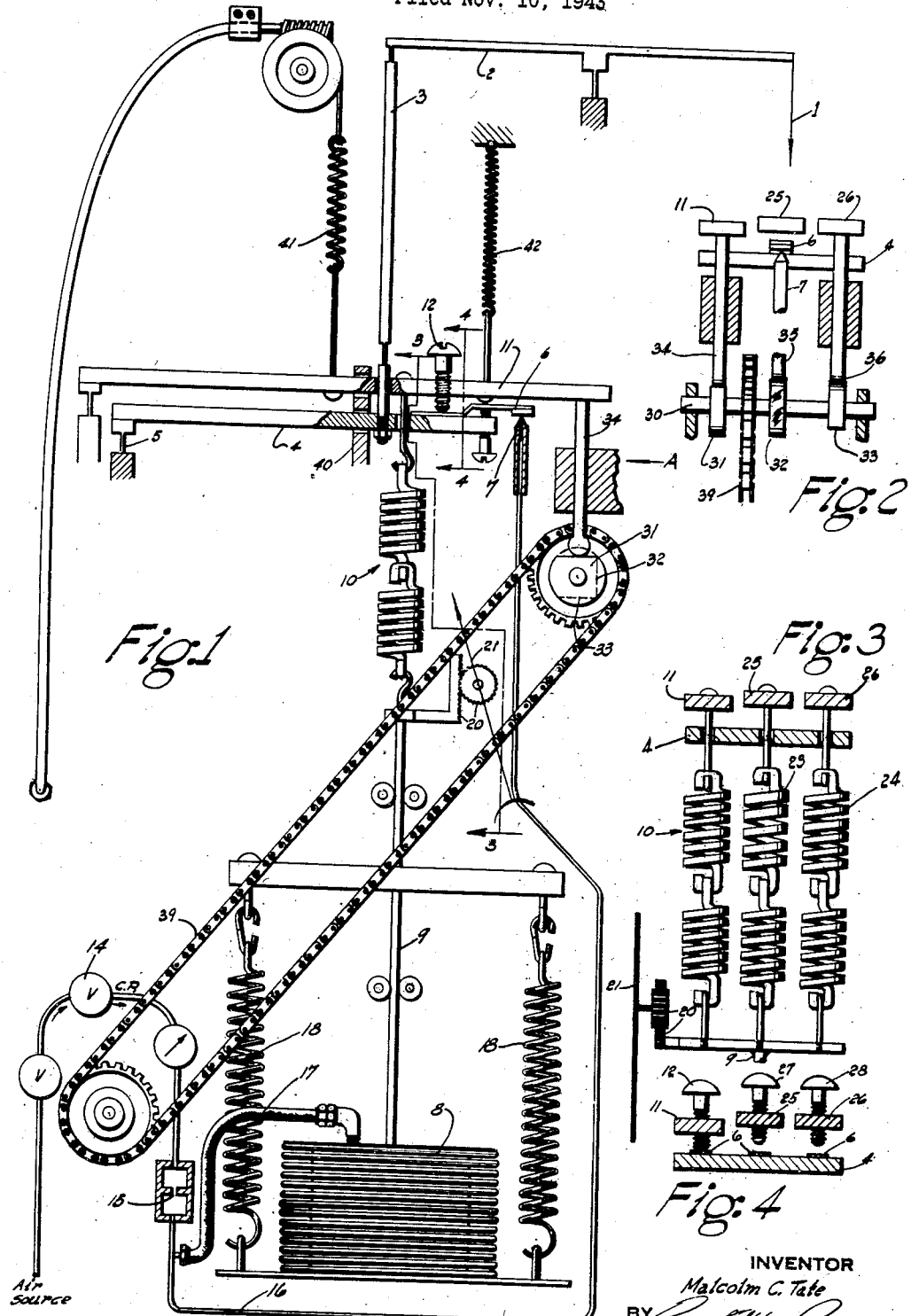
INVENTOR
Malcolm C. Tate
BY
ATTORNEY Patented Aug. 29, 1944

2,357,272

UNITED STATES PATENT OFFICE 2,357,272

MULTIPLE LOAD RANGE WEIGHING SYSTEM

Malcolm C. Tate, Stamford, Conn., assignor to The Baldwin Locomotive Works, a corporation of Pennsylvania Application November 10, 1943, Serial No. 509,950

5 Claims. (Cl. 265—27)

This invention relates generally to load weighing apparatus and more particularly to a multiple load range weighing system for weighing relatively small loads.

A great deal of difficulty has been encountered when small loads generally under 150 pounds or so were attempted to be measured with accuracy, sensitivity and responsiveness in the field of testing such as in determining strength of materials or testing airplane models in wind tunnels or in many other fields in which a load is generated at some external point and transmitted to the weighing system. Usually the transmission is through links, levers or hydraulic fluid and under such circumstances the problem of adequately measuring small loads and small load changes becomes particularly acute.

It is an object of my invention to provide an improved weighing system that is particularly adapted for weighing relatively light loads in the testing field and in which the elements of the weighing system have a high degree of stability as well as being relatively economical in construction, operation and maintenance, while at the same time having a high degree of sensitivity, accuracy and responsiveness.

A further object is to provide a multiple load range weighing system in the testing field having the ability to shift from one load range to another with ease, dispatch and smoothness, notwithstanding that very small load changes are being measured. In accordance with the principles of my invention, it is possible to measure over a total load range as small as only 2 pounds which means that the indicator hand rotates over the full scale of an indicating dial in response to a 2 pound load.

Other objects and advantages will be more apparent to those skilled in the art from the following description of the accompanying drawing in which:

Fig. 1 diagrammatically illustrates my improved weighing system;

Fig. 2 is a view looking in the direction of arrow "A" at Fig. 1 with parts shown in section and other parts broken away for purposes of clarity; and Figs. 3 and 4 are transverse sections taken substantially on the lines 3—3 and 4—4 of Fig. 1.

In the particular embodiment of the invention disclosed herein for purposes of illustration, a load 1 to be measured is applied to a beam 2 suitably pivotally supported on a fulcrum plate or other pivotal type means to transmit the load through another fulcrum plate to a load rod 3. This rod is suitably connected by a fulcrum plate to a load receiving plate 4 one end of which is pivotally supported preferably by a fulcrum plate 5 to a stationary base while its other end, free to move, carries a baffle element 6 therewith. A normally fixed air jet nozzle 7 is adapted to discharge against baffle 6 so as to control the air pressure in a servo-motor 8 specifically of a bellows type for transmitting a restoring action through a rod 9 and iso-elastic springs 10 to a load range plate 11. The plate 11 has a screw 12 for engaging load receiving plate 4 to return it and the baffle 6 toward its initial position. This air jet baffle weighing type of system is of the same general type disclosed in my Patent No. 2,325,345 and hence this part of the system need only be briefly described herein.

Air pressure is supplied to the baffle and jet from any suitable air source through suitable valves including a constant pressure outlet valve 14, an orifice 15, a pipe 16 and a pipe 17 flexibly connected to sylphon bellows 8 so as to be able to move with the bellows when pressure therein varies in accordance with an increase or decrease of air flow through jet 7. As the load increases the baffle 6 is raised thereby allowing a greater rate of discharge through the jet orifice and accordingly causing pressure in bellows 8 to decrease. This allows a pair of springs 18 to pull downwardly on rod 9 and on iso-elastic springs 10 in series therewith and thence through screw 12 to move load receiving plate 4 so as to restore baffle 6 substantially to its original position thereby to establish a pressure in bellows 8 sufficient to create a balance of forces. When the load 1 decreases the jet discharge is decreased to effect opposite restoring movement of bellows 8. Movement of the bellows in response to a load change is transmitted through a usual rack and pinion 20 which operates an indicating hand 21 or other suitable recording or responsive apparatus both of which may be considered broadly to be indicating mechanism.

To obtain multi-load ranges in a simple, direct and positive manner I provide additional iso-elastic springs of different degrees of flexibility and of any suitable number depending upon the number of load ranges desired and then selectively bring these springs into cooperative action with the load receiving plate 4. Specifically I have shown two additional springs 23 and 24, Fig. 3, commonly connected at their lower ends to the upper end of the rod 9 while their upper ends extend through suitable openings in load receiving plate 4 and are connected to individual load range fulcrum plates 25 and 26 corresponding in function to load range plate 11. The plates 25 and 26 are also provided with individual screws 27 and 28 for engaging the load receiving plate 4 which is sufficiently wide to be engaged by any one of the three sets of screws. To bring any one of the iso-elastic springs into action on load plate 4 I provide means for selectively lifting the load range plates 11, 25 or 26 together with screws 12, 27 and 28 away from contact with the load receiving plate. This is accomplished by a camshaft 30 having a series of cams 31, 32 and 33 and operating rods 34, 35 and 36 which extend upwardly to engage the underside of the load range plate 11, 25 and 26 to selectively raise the same out of action. As shown in Fig. 4, the plates 25 and 26 are already raised by their respective cams 32 and 33 out of contact with the load receiving plate 4, thereby leaving only range plate 11 and its spring 10 to bear upon the plate 4 through screw 12. To disengage spring 10 the camshaft 30 is suitably manually rotated from any source as through a sprocket chain 39 so as to cause cam 31 to raise rod 34 and simultaneously lower one or the other of the remaining rods 35 or 36. The cams are angularly displaced from each other as indicated by the flat surfaces of the cams 31, 32 and 33 in Fig. 1.

From the foregoing disclosure it is seen that a very small load directly applied to the pivotal load receiving plate 4 is adapted to control the jet baffle elements in response to either increase or decrease of load while the desired load range may be very quickly and easily selected merely by rotating camshaft 30 without involving any interruptions of the applied load. Hence it is possible to weigh and measure extremely small loads and changes of loads at 1 with a high degree of accuracy, sensitivity and responsiveness and yet instantly shift from one range to another. The multi-load shifting mechanism is not only relatively simple in construction, operation and maintenance but is highly flexible in its selectivity. A suitable slotted member 40, Fig. 1, may be employed as a limit stop for the various plates, etc. to prevent any possible damage thereto. Also if desired zero adjusting springs such as 41 may be individually connected to the spring plates 11, 25 and 26 and similarly individual tare load springs 42 may be connected to the spring plates. The zero adjustment springs 41, etc. are more fully described in my copending application Serial No. 394,962, filed May 24, 1941 (now Patent No. 2,331,962) and hence a description of the same need not be given here.

It will of course be understood that various changes in details of construction and arrangement of parts may be made by those skilled in the art without departing from the spirit of the invention as set forth in the appended claims.

I claim:

1. A load weighing system comprising, in combination, a load receiving member, means for transmitting a load thereto to move the same, a plurality of load range members, a plurality of springs respectively connected to said load range members, a common servo-motor connected to all of said springs and adapted to impose a force on said load receiving member through any one of said load range members and the springs connected thereto, said force being in opposition to an applied load to be weighed, means controlled by initial movement of said load receiving member in response to a change of load thereby to operate said servo-motor so as to establish a balance between the applied load force and said opposing force, and means for selectively connecting certain of said load range members to said load receiving member so as to cause the system to have a load range in proportion to the flexibility of the spring connected to the selected load range member.

2. The combination set forth in claim 1 further characterized in that the selecting means includes a plurality of cams adapted to selectively move the load range member out of operative relation to the load receiving member.

3. The combination set forth in claim 1 further characterized in that the selecting means includes a plurality of cams mounted upon a common shaft and adapted to selectively move the load range members out of operative relation to the load receiving member.

4. The combination set forth in claim 1 further characterized in that said plurality of load range members lie in overlapping relation to the load receiving member.

5. The combination set forth in claim 1 further characterized in that said plurality of load range members lie in overlapping relation to the load receiving member, and screws interposed between said load range and load receiving members and threadedly carried by certain of the same to adjustably control mechanical engagement between the load receiving member and the load range member.

MALCOLM C. TATE.